Nov. 5, 1946.　　　　E. W. DAVIS　　　　2,410,480
LUBRICANT FITTING
Filed Jan. 8, 1943
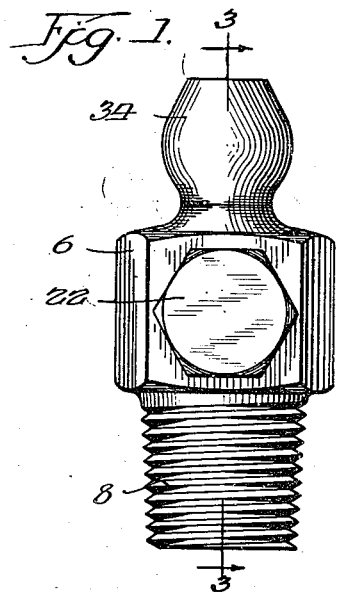
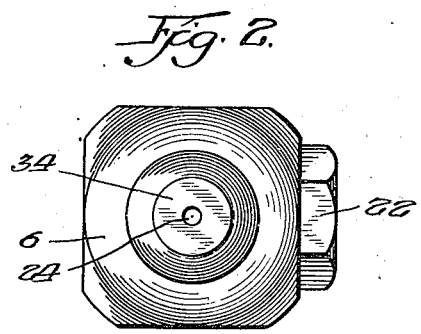
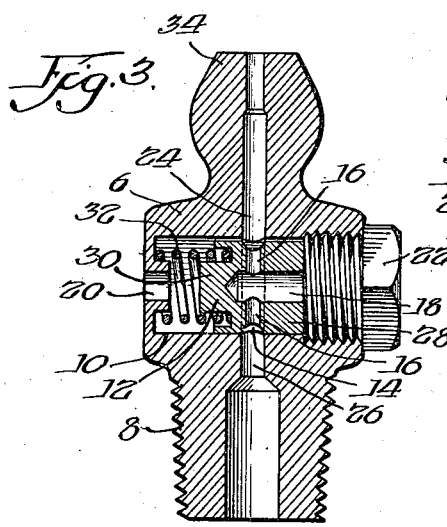
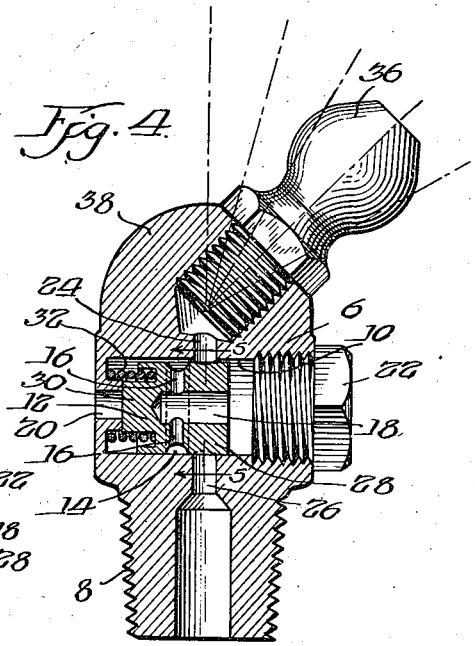
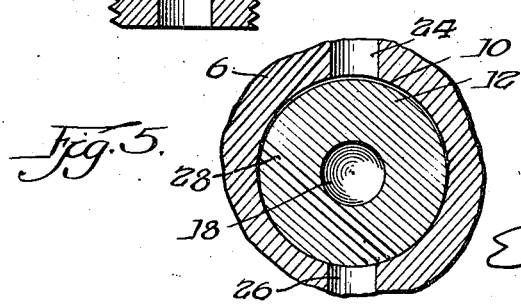
Inventor:
Ernest W. Davis Patented Nov. 5, 1946

2,410,480

UNITED STATES PATENT OFFICE 2,410,480

LUBRICANT FITTING

Ernest W. Davis, River Forest, Ill., assignor to Stewart-Warner Corporation, Chicago, Ill., a corporation of Virginia Application January 8, 1943, Serial No. 471,670

2 Claims. (Cl. 50—35)

My invention relates to lubricant fittings in which the lubricant pressure which may be applied to a device on which the fitting is installed, is limited to a predetermined value. The present invention is an improvement over a fitting of the same class, as disclosed in my United States Patent Number 2,087,085, of July 13, 1937.

One object of the present invention is to obviate the necessity of a close fit in the grease piston which operates the valve. Both constructions employ a piston which slides within a cylinder. In the prior construction high precision manufacture was necessary in order to prevent leakage past the piston when high lubricant pressure was applied to the fitting. In the present invention leakage is prevented without the use of a close fit, by means of a construction which will be described hereinafter.

Another object is to provide a valve for the fitting which is more dependable than the valve in the prior construction and one which is less liable to leak due to the presence of particles of foreign substances in the lubricant.

A further object is to provide a fitting of the class described which is adaptable for the assembly of a lubricant nipple at a selective angle, whereby the most advantageous angle may be selected for convenient application of a high pressure lubricant coupling, so as to provide the necessary accessibility under the wide range of conditions encountered in actual practice. These and other objects will appear as the description proceeds.

In the drawing:

Figure 1 is an elevation of the improved fitting;

Figure 2 is a plan of the same;

Figure 3 is a longitudinal, sectional elevation, the section being taken on the line 3, 3, in Figure 1;

Figure 4 is a central, longitudinal, sectional elevation of a modified form of the improved fitting, which provides for connecting a lubricant nipple at various selective angles; and Figure 5 is a fragmentary, enlarged, transverse section through the cylinder and piston, the section being taken on the line 5, 5, in Figure 4.

The body member 6 is provided with a threaded portion 8 for screwing the fitting into a bearing or other device requiring a supply of lubricant. The body member 6 is also provided with a cylinder 10 for receiving the piston 12, which has an annular groove 14 connected by cross holes 16, 16 with a central bore 18. The cylinder 10 is provided with a vent port 20 at the low pressure end and is closed at the high pressure end by the plug 22. The cylinder 10 has an inlet port 24 and an outlet port 26.

The slide valve 28 is integral with the piston 12, and is movable to a position as shown in Figure 3, in which the outlet port 26 is uncovered, which position will be described hereinafter as the "uncovering position." The slide valve 28 is also movable to the position shown in Figure 4, in which the outlet port 26 is covered, which position will be described hereinafter as the "covering position." The check valve 30 is integral with the piston 12, and closes the vent port 20 when the slide valve 28 occupies its covering position as shown in Figure 4, and opens the vent port 20 when the slide valve 28 occupies its uncovering position as shown in Figure 3.

The spring 32 urges the slide valve 28 towards its uncovering position and holds the slide valve 28 in this position normally, but when the lubricant pressure in the outlet port 26 rises sufficiently, as when a bearing or grease cavity becomes filled with lubricant, then the lubricant pressure is transmitted through the cross holes 16, 16, and the central bore 18 and exerts a pressure on the piston 12 which causes the slide valve 28 to be moved to the covering position as shown in Figure 4, in which the outlet port 26 is covered by the sleeve valve 28.

At the same time, the check valve 30 closes the vent port 20, so that lubricant cannot leak past the piston 12 and escape. The cylinder 10, piston 12, and slide valve 28 are manufactured with commercial, high-production tolerances so that a maximum clearance of several thousandths of an inch between the piston and cylinder is necessary for manufacturing purposes. This clearance is exaggerated in the drawing in order to make its presence apparent. Obviously with this amount of clearance, excessive leakage past the piston 12 would occur during the application of high pressure to the fitting unless the check valve 30 were provided, and as this check valve is obtained without any extra manufacturing cost, its advantage is apparent.

When high lubricant pressure is applied to the fitting, the slide valve 28 will occupy its covering position as shown in Figure 4, and the slide valve 28 will then be forced down against the outlet port 26 to the position most clearly illustrated in Figure 5, in which position the outlet port 26 is sealed effectually even with a loose fitting piston and slide valve manufactured by high production methods.

The nipple portion 34 is integral with the body member 6, and is of the common, well known type, suitable for connection with a standard coupling, as ordinarily provided on a grease gun. In the construction illustrated in Figure 4, a separate nipple 36 is provided, and this is screwed into the dome shaped top 38 at any selected angle as illustrated by the broken lines, which illustrate the angles most commonly used for providing the necessary accessibility for application of a grease gun.

The tool marks left in the face of the check valve 30 by the cutting-off tool in the automatic screw machine in which the part is made, provide sufficient slow leakage to permit the internal pressure in the fitting to dissipate in a reasonable length of time after the grease gun has been detached from the fitting, so that the spring 32 may restore the slide valve 28 to its normal position as illustrated in Figure 3.

It will be observed that the flat surface of the check valve 30 permits it to seat against the vent port 20 in an effective manner even though the piston 12 may be slightly displaced laterally when the slide valve 28 is forced against the outlet port 26.

The reciprocating movement of the slide valve 28 across the outlet port 26 tends to scrape off any particles of foreign substance that might be contained in the grease.

Without further elaboration the foregoing will so fully explain my invention that others may, by applying knowledge current at the time of application, readily adapt the same for use under various conditions of service.

I claim:

1. A pressure-controlling lubricant receiving fitting comprising a body having an inlet, an outlet, a vent port, and having a cylinder in communication with the vent port and providing a connection between the inlet and outlet; a piston fitting loosely in said cylinder and having the face thereof opposite the vent port subjected to the pressure of lubricant supplied through the inlet port, said piston providing a passageway normally connecting the inlet and outlet, and a spring normally holding said piston away from the vent port, said piston being operable when the lubricant pressure at the outlet exceeds a predetermined value to move against the force of the spring and thereby cut off communication between the inlet and the outlet, said piston having a substantially flat valve face operable to close said vent port when said piston is moved to the end of its stroke by the application of said predetermined pressure.

2. A pressure-controlling lubricant receiving fitting comprising a body having an inlet, an outlet, a vent port surrounded by a flat valve seat, and having a cylinder in communication with the vent port and providing a connection between the inlet and outlet, means closing the end of the cylinder opposite the vent port, a piston fitting loosely in said cylinder and having the face thereof opposite the vent port subjected to the pressure of lubricant supplied through the inlet port, said piston providing a passageway normally connecting the inlet and outlet, and a spring normally holding said piston away from the vent port, said piston being operable when the lubricant pressure at the outlet exceeds a predetermined value to move against the force of the spring and thereby cut off communication between the inlet and the outlet, said piston having a substantially flat valve face cooperable with said valve seat to close said vent port when said piston is moved to the end of its stroke by the application of said predetermined pressure.

ERNEST W. DAVIS.